No. 800,452. PATENTED SEPT. 26, 1905.
O. KOHN.
MEAT CHOPPER.
APPLICATION FILED MAR. 20, 1905.

Witnesses
E. F. Wilson
R. A. Fischer

Inventor
Oswald Kohn
By Rudolph Wm. Lotz
Atty.

UNITED STATES PATENT OFFICE.

OSWALD KOHN, OF CHICAGO, ILLINOIS.

MEAT-CHOPPER.

No. 800,452.  Specification of Letters Patent.  Patented Sept. 26, 1905.

Application filed March 20, 1905. Serial No. 251,041.

*To all whom it may concern:*

Be it known that I, OSWALD KOHN, a citizen of Austria-Hungary, residing at Chicago, in the county of Cook and State of Illinois, have invented certain new and useful Improvements in Meat-Choppers; and I do hereby declare the following to be a full, clear, and exact description of the invention, such as will enable others skilled in the art to which it appertains to make and use the same.

My invention relates to a novel construction in a meat-chopper, the object being to provide a machine of this character which will divide or cut the meat sufficiently fine in a single operation or passage to fit it for use for sausage-fillings; and it consists in the features of construction and combinations of parts hereinafter fully described and claimed.

Figure 1:
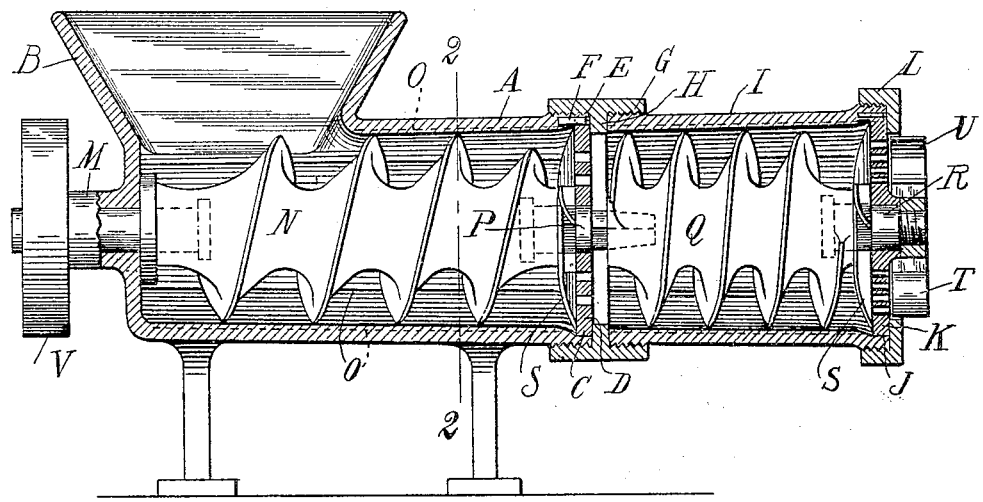
Figure 2:
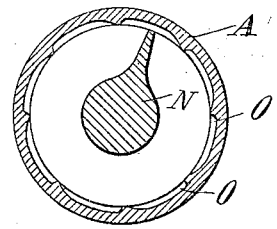
Figure 3:
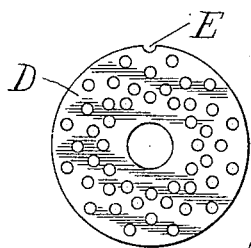
Figure 4:
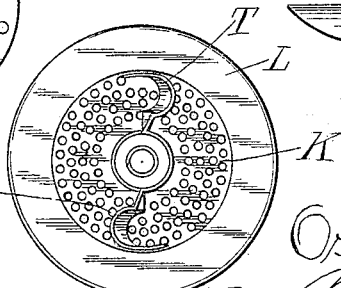
Figure 5:
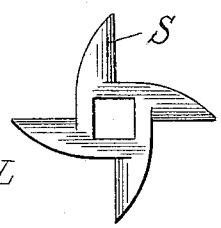

In the accompanying drawings, illustrating my invention, Figure 1 is a central vertical longitudinal section of a meat-chopper constructed in accordance with my invention. Fig. 2 is a detail vertical transverse section on the line 2 2 of Fig. 1. Fig. 3 is a view in elevation of a foraminated plate through which the chopped meat is forced. Fig. 4 is a view in elevation of a rotary knife employed to cut the meat. Fig. 5 is a view in elevation of the delivery end of the machine.

My invention has for its particular object to provide a machine for chopping or finely dividing meat in which the meat is forced against a foraminated plate and compressed partially into the same, such portions so compressed or forced into the perforations being cut or sheared off by means of rotary blades or cutters moving over the surface of said plate and in contact therewith, the portions so cut or sheared being gradually fed through said perforations into a second chamber through which they are advanced more slowly and forced against a second foraminated plate having smaller perforations and are again cut or sheared and more finely divided, an essential feature of my invention residing in advancing such meat more slowly through the last than through the first chamber for reasons which will be hereinafter more fully set forth.

My said machine comprises a cylindrical casing A, which is horizontally disposed and is provided at one end with a hopper B to receive the meat to be chopped. Said casing is externally threaded at its other end and is provided at said end with an internal annular recess C, in which a foraminated plate D is adapted to be received, the latter being provided with a peripheral recess E, adapted to receive a suitable key F to hold same against revolution relatively to said casing. The said plate D is held in place in said annular recess C by means of an internally-threaded collar G, provided with an internal annular flange H, bearing against said plate, said collar being adapted to receive a cylindrical extension I of said casing A, the other end of the latter being similarly externally threaded and provided with an internal annular recess J to receive a second foraminated plate K, having smaller perforations than said plate D, and which is similarly held against rotation by means of a peripheral recess and key, said plate being held in place by means of a flanged internally-threaded collar L, fitting the threaded end of said extension I. Said casing A is provided in its end wall with a bearing M for the trunnion of a spiral conveyer N, by means of which meat introduced into said casing through said hopper B is carried toward said plate D, said casing being provided internally with longitudinal grooves O, which are adapted to prevent the meat introduced from revolving with said conveyer, thereby causing same to be fed constantly forward. At its other end said conveyer N is provided with a trunnion P, which is journaled in a central opening in the plate D, the projecting end of said trunnion being squared and adapted to fit a recess in the end of a spiral conveyer Q, disposed in the extension I of said casing, the other end of said conveyer Q having a trunnion R journaled in the central opening in the plate K. Mounted on said trunnions P and R, within said casing A and extension I, are four armed cutters or knives S, the sharp edges of which travel over the plates D and K and coact with the sharp edges of the perforations therein to cut or shear the meat, said knives being rigidly mounted upon said trunnions to revolve with the same and being somewhat elastic, so that the pressure exerted on the blades by the meat will serve to hold the cutting edges thereof in close contact with said plates D and K. The said conveyers N and Q have different pitches, the conveyer N being adapted, for example, to feed the meat one inch at each revolution and the conveyer Q to feed the same one-half inch at each revolution. Said conveyer N forces the meat against the plate D and partially into the perforations therein. At each quarter of a revolution the portions of the meat thus forced into said perforations are cut off and gradually forced through by the succeeding pieces into the extension I. The relatively finely divided meat in the latter is forced against the more finely perforated plate K at, for example, one-half the speed that the same is forced against and through the plate D, and by reason of the smaller diameter of the perforations and the relatively greater (or double) the number of cutting operations per inch of longitudinal movement such meat will obviously be delivered in a very finely divided state. On the projecting end of the trunnion R of said conveyer Q is mounted a scraper T, consisting of a substantially S-shaped member U, the arms of which are set at an angle, so as to give same the action of a spiral conveyer, which serves to remove the finely-divided meat and enables the operator to more readily remove the last particles thereof without undue handling. The extension I of said casing A is similarly provided with internal longitudinal grooves to prevent rotation of the meat with the conveyer Q.

My said machine is very efficient and can be easily taken apart and assembled for purposes of keeping it clean. It may be operated by hand or power by means of a suitable appliance—as, for instance, the pulley V on the trunnion at the forward end of the conveyer N.

I claim as my invention—

1. A meat-chopper comprising in combination, two cylindrical chambers, a plate having relatively large perforations disposed between the same, a plate having relatively small perforations disposed in the end of the second chamber, a spiral conveyer having relatively steep pitch revolubly mounted in the first chamber, a spiral conveyer of relatively light pitch revolubly mounted in the second chamber and connected with said first-named conveyer to revolve therewith, and cutters having a plurality of arms having their sharp edges bearing upon said perforated plates and revolving with said conveyers to cut the meat as it enters the perforations in said plates.

2. A meat-chopper comprising in combination, two cylindrical chambers, a plate having relatively large perforations disposed between the same, a plate having relatively small perforations disposed in the end of the second chamber, a spiral conveyer having relatively steep pitch revolubly mounted in the first chamber, a spiral conveyer of relatively light pitch revolubly mounted in the second chamber and connected with said first-named conveyer to revolve therewith, and cutters having a plurality of arms having their sharp edges bearing upon said perforated plates and revolving with said conveyers to cut the meat as it enters the perforations in said plates, and a scraper disposed on the trunnion of said second conveyer beyond the second perforated plate.

In testimony whereof I have signed my name in presence of two subscribing witnesses.

OSWALD KOHN.

Witnesses:
RUDOLPH WM. LOTZ,
ARTHUR C. LOTZ.